US012792425B2

(12) United States Patent
Hu et al.

(10) Patent No.: US 12,792,425 B2
(45) Date of Patent: Nov. 10, 2026

(54) DATA PROCESSING METHOD, ELECTRONIC DEVICE AND COMPUTER-READABLE STORAGE MEDIUM

(71) Applicants: Beijing Volcano Engine Technology Co., Ltd., Beijing (CN); Lemon Inc., Grand Cayman (KY); Shanghai Jiao Tong University, Shanghai (CN)

(72) Inventors: Yongmin Hu, Beijing (CN); Jing Wang, Beijing (CN); Cheng Zhao, Beijing (CN); Yibo Liu, Beijing (CN); Cheng Chen, Singapore (SG); Xiaoliang Cong, Beijing (CN); Chao Li, Shanghai (CN)

(73) Assignees: Beijing Volcano Engine Technology Co., Ltd., Beijing (CN); Lemon Inc., Grand Cayman (KY); Shanghai Jiao Tong University, Shanghai City (CN)

( * ) Notice: Subject to any disclaimer, the term of this patent is extended or adjusted under 35 U.S.C. 154(b) by 101 days.

(21) Appl. No.: 18/800,654

(22) Filed: Aug. 12, 2024

(65) Prior Publication Data

US 2025/0156247 A1 May 15, 2025

(30) Foreign Application Priority Data

Nov. 9, 2023 (CN) ........................ 202311491878.5

(51) Int. Cl.
*G06F 9/52* (2006.01)

(52) U.S. Cl.
CPC .................................. *G06F 9/526* (2013.01)

(58) Field of Classification Search
None
See application file for complete search history.

(56) References Cited

U.S. PATENT DOCUMENTS

| | | | | |
|---|---|---|---|---|
| 10,142,122 | B1 * | 11/2018 | Hill | H04L 12/2807 |
| 10,229,223 | B2 * | 3/2019 | Anchuri | G06F 16/2465 |
| 10,324,961 | B2 * | 6/2019 | Chen | G06F 16/9024 |
| 11,861,912 | B2 * | 1/2024 | Shao | G16Y 40/35 |
| 2007/0169042 | A1 | 7/2007 | Janczewski | |

(Continued)

FOREIGN PATENT DOCUMENTS

| | | |
|---|---|---|
| CN | 115809243 A | 3/2023 |
| CN | 115631793 B | 5/2023 |

(Continued)

OTHER PUBLICATIONS

Harnad, Stevan. "To Cognize is to Categorize: Cognition is Categorization". Lefebvre C., & H. Cohen (Eds.) (2005) Handbook on Categorization. Elsevier. Dated 2005. Available: https://eprints.soton.ac.uk/261725/4/catconf.htm. (Year: 2005).*

(Continued)

*Primary Examiner* — Michael Sun

(57) ABSTRACT

Embodiments of the present disclosure provide a data processing method, an electronic device, and a computer-readable storage medium. In a community division scenario, a community division algorithm is performed in parallel, through a plurality of threads and using fine-grained locks implemented based on atomic operation instructions, on a relationship network to realize community division.

20 Claims, 4 Drawing Sheets

(56) References Cited

U.S. PATENT DOCUMENTS

| | | | | |
|---|---|---|---|---|
| 2010/0114484 | A1* | 5/2010 | Kida | G01C 21/30<br>707/758 |
| 2015/0193277 | A1 | 7/2015 | Archer et al. | |
| 2016/0283540 | A1 | 9/2016 | Barber et al. | |
| 2018/0276688 | A1 | 9/2018 | Duenner et al. | |
| 2023/0315693 | A1 | 10/2023 | Aya et al. | |

FOREIGN PATENT DOCUMENTS

| | | | |
|---|---|---|---|
| JP | 2017-204161 | A | 11/2017 |
| JP | 2022-116607 | A | 8/2022 |

OTHER PUBLICATIONS

"Cognitive categorization". Available: https://web.archive.org/web/20240630121030/https://en.wikipedia.org/wiki/Cognitive_categorization, updated Jun. 30, 2024. (Year: 2024).*

Office action received from Japanese patent application No. 2024-126495 mailed on Sep. 30, 2025, 7 pages (4 pages English Translation and 3 pages Original Copy).

Second Office Action for Chinese Application No. 202311491878.5, mailed Oct. 24, 2024, 8 pages.

European Search Report for EP Patent Application No. 24193928.9, Issued on Feb. 5, 2025, 9 pages.

Nguyen, "Leiden-Based Parallel Community Detection", Karlsruhe Institute of Technology, Oct. 12, 2021, pp. 1-44.

Registration Procedure Notice received from Chinese patent application No. 202311491878.5 mailed on Mar. 3, 2025, 5 pages (1 pages English Translation and 4 pages Original Copy).

Anonymous, "Leiden", 2019, pp. 1-13.

Office action received from Chinese patent application No. 202311491878.5 mailed on May 20, 2024, 11 pages (5 pages English Translation and 6 pages Original Copy).

Oriental Little Shrimp, "(Leiden)From Louvain to Leiden: guaranteeing well-connected communities", CSDN, Mar. 18, 2022, pp. 1-19.

Zheng et al., "Operating system architecture for data center computing and its key technologies: A survey", ResearchGate, vol. 27, No. 8, Aug. 2017, pp. 675-689.

* cited by examiner

DATA PROCESSING METHOD, ELECTRONIC DEVICE AND COMPUTER-READABLE STORAGE MEDIUM

The application claims priority to the Chinese patent application No. 202311491878.5, filed on Nov. 9, 2023, the entire disclosure of which is incorporated herein by reference as part of the present application.

TECHNICAL FIELD

Embodiments of the present disclosure relate to the technical field of computer and big data processing, in particular to a data processing method and apparatus, an electronic device, and a computer-readable storage medium.

BACKGROUND

With the development of modern informatization, different types of networks have emerged, such as an Internet of Things, an urban transportation network, a medical network, a power network, and a social network. These networks may be relational networks. A community is a set of nodes in a network, and the relation between these nodes is closer than a relation of other nodes in the network. Performing community division on these networks may facilitate understanding of network structures of these networks.

SUMMARY

Embodiments of the present disclosure provide a data processing method and apparatus, an electronic device, and a computer-readable storage medium.

In a first aspect, at least one embodiment of the present disclosure provides a data processing method, the method comprises:

acquiring a target relationship network associated with a first object according to a first operation for the first object, in which the target relationship network is configured to represent an association relationship between a plurality of objects through a node network relationship; controlling a plurality of threads to perform a community division on the target relationship network in parallel using locks implemented based on an atomic operation instruction, to obtain a plurality of first node communities, in which each of the first node communities comprises at least one node in the target relationship network; and determining the first node community to which the first object belongs according to an association relationship between the first object and objects corresponding to nodes in the target relationship network.

In a second aspect, at least one embodiment of the present disclosure provides a data processor apparatus, the data processor apparatus comprises an acquisition unit, a processor unit and a determination unit. The acquisition unit is configured to acquire a target relationship network associated with a first object according to a first operation for the first object; the target relationship network is configured to represent an association relationship between a plurality of objects through a node network relationship; the processor unit is configured to control a plurality of threads to perform a community division on the target relationship network in parallel using locks implemented based on an atomic operation instruction, to obtain a plurality of first node communities, wherein each of the first node communities comprises at least one node in the target relationship network; and the determination unit is configured to determine the first node community to which the first object belongs according to an association relationship between the first object and objects corresponding to nodes in the target relationship network.

In a third aspect, at least one embodiment of the present disclosure provides an electronic device which comprises a processor and a memory; the memory stores computer-executable instructions; and the processor executes the computer-executable instructions stored on the memory so that at least one processor executes the data processing method according to any one of the methods relates to any one of the above-mentioned first aspect and second aspect.

In a fourth aspect, at least one embodiment of the present disclosure provides a computer-readable storage medium, the computer-readable storage medium stores computer-executable instructions, and upon the computer-executable instructions being executed by a processor, the data processing method according to any one of the methods relates to any one of the above-mentioned first aspect and second aspect is implemented.

In a fifth aspect, at least one embodiment of the present disclosure provides a computer program product, the computer program product includes a computer program, upon the computer program being executed by a processor, the data processing method according to any one of the methods relates to any one of the above-mentioned first aspect and second aspect is realized.

According to the data processing method and apparatus, and the electronic device provided by the embodiments, a target relationship network associated with a first object is acquired by a first operation for the first object, and the target relationship network is configured to represent an association relationship between a plurality of objects through a node network relationship; a plurality of threads are controlled to perform a community division on the target relationship network in parallel using locks implemented based on an atomic operation instruction, to obtain a plurality of first node communities; each first node community includes at least one node in the target relationship network; and the first node community to which the first object belongs is determined according to an association relationship between the first object and objects corresponding to nodes in the target relationship network. Because community division is performed in parallel on the target relationship network using the locks implemented based on the atomic operation instructions, the efficiency and stability of community division on a social network are improved, and therefore, a node community to which an object belongs can be determined rapidly and accurately.

BRIEF DESCRIPTION OF DRAWINGS

To describe the technical solutions in the embodiments of the present disclosure or in the prior art more clearly, the accompanying drawings required in the description of the embodiments or the prior art will be described briefly below. Apparently, the drawings in the following description are some embodiments of the present disclosure, other accompanying drawings can also be derived from these drawings by those ordinarily skilled in the art without creative efforts.

DETAILED DESCRIPTION

In order to make the purpose, technical scheme and advantages of the embodiments of the present disclosure clearer, the technical schemes in the embodiment of the present disclosure will be described clearly and completely with the attached drawings. Obviously, the described embodiments re a part of the embodiment of the present disclosure, but not the whole embodiment. Based on the embodiments of the present disclosure, all other embodiments obtained by ordinary technicians in the art without creative work belong to the protection scope of the present disclosure.

Community division is performed on a topology map of a network typically using a community division (also referred to as social detection) algorithm. Here, social division methods may include Louvain algorithm and Leiden algorithm, etc. However, the community division algorithm is typically performed serially, which is inefficient in community division on a large-scale relationship network. In addition, the above-mentioned community division algorithm cannot be applied to a distributed relationship network with nodes distributed in different devices.

When community division is performed on the relationship network, due to a limitation on an upper bound of a number of nodes in a node community which is to be resulted, the problem of competition may arise in the case that community division is performed in parallel on the relationship network by a plurality of threads. To address the problem of competition arising in implementing community division in parallel, a locking mechanism may be used. However, typically, if competition is solved by a locking mechanism, a lock needs to be obtained first, and then a series of operations such as obtaining a value, accumulation, comparison, and replacement are performed. During this process, a thread obtaining the lock might be interrupted, resulting in a long time taken by this process. Consequently, the efficiency of concurrent implementation of community division is restricted, and the stability of community division is poor.

According to the solutions provided by the present disclosure, community division is performed in parallel on a relationship network by a plurality of threads using fine-grained locks implemented based on atomic operation instructions, and a series of operations such as obtaining a value, accumulation, comparison, and replacement needed to solve competition are packaged as instruction level atomic operations by the fine-grained locks implemented based on the atomic operation instructions. Due to inseparability of the atomic operations, the thread obtaining the fine-grained locks will not be interrupted during the process of performing the series of operations mentioned above, and the efficiency and stability of community division are improved. Thus, node communities corresponding to objects can be determined rapidly and accurately.

Figure 1:
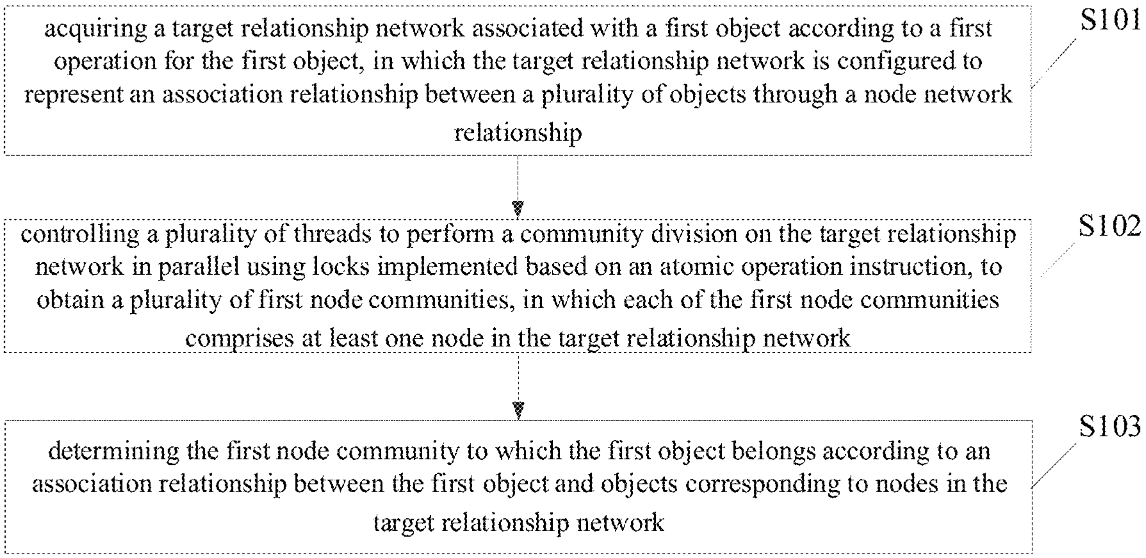
FIG. 1 is a schematic flowchart I of a data processing method provided by the present disclosure.

Referring to FIG. 1, FIG. 1 shows a schematic flowchart I of a data processing method provided by the present disclosure. As shown in FIG. 1, the data processing method includes:

S101: acquiring a target relationship network associated with a first object according to a first operation for the first object, in which the target relationship network is configured to represent an association relationship between a plurality of objects through a node network relationship;

S102: controlling a plurality of threads to perform a community division on the target relationship network in parallel using locks implemented based on an atomic operation instruction, to obtain a plurality of first node communities, in which each of the first node communities comprises at least one node in the target relationship network; and

S103: determining the first node community to which the first object belongs according to an association relationship between the first object and objects corresponding to nodes in the target relationship network.

In this embodiment, a performing agent for performing the data processing method may be a server that provides a data service for a client.

The data processing method provided by the present disclosure may be applied to a recommendation service scenario, a financial service scenario, and the like. The recommendation service scenario includes a social friend recommendation scenario, a commodity recommendation scenario, and the like. The financial service scenario includes an intelligent risk management scenario, an anti-fraud identification scenario, and the like.

Taking the social friend recommendation scenario as an example, a first user may perform a contact adding operation (the first operation) on a second user (the first object) in a page of a social network using a client. The above-mentioned client may send the information of the contact adding operation to the server. The server may acquire a target relationship network associated with the second user. The target relationship network includes nodes corresponding to a plurality of users having an association relationship with the second user. A plurality of threads are controlled to perform community division on the above-mentioned target relationship network in parallel using locks implemented based on atomic operation instructions, and a plurality of first node communities are determined according to a community division result. At least one other target user is then determined from an association relationship between each node in the plurality of first node communities and the second user. For example, users having an association relationship strength greater than a preset threshold are taken as other target users. The information of other target users is recommended to the first user. Accordingly, social friend recommendation can be achieved rapidly and accurately.

Taking the intelligent risk management scenario in the financial field as an example, the server determines a first entity (the first object) as a risk entity according to a risk management evaluation result, and sets a risk entity label for the first entity (the first operation). The server may acquire the target relationship network associated with the first entity. The target relationship network may include nodes corresponding to a plurality of users having the association relationship with the first entity. A plurality of threads are controlled to perform community division on the above-mentioned target relationship network in parallel using locks implemented based on atomic operation instructions, and a plurality of first node communities are determined according to a community division result. At least one third user is then determined from an association relationship between each node in the plurality of first node communities and the first entity. For example, users having an association relationship strength greater than a preset threshold are taken as third users. Accordingly, the information that the third users are risk users is pushed to a financial institution. Thus, the information of risk users may be pushed to the financial institution rapidly and accurately to avoid a financial loss.

Taking an article recommendation scenario as an example, a user has searched (the first operation) for a first article (the first object) on a network platform providing articles. A server of the network platform may acquire a target relationship network associated with the first article. The target relationship network includes nodes corresponding to a plurality of objects. A plurality of threads are controlled to perform community division in parallel on the above-mentioned target relationship network using locks implemented based on atomic operation instructions, and a plurality of first node communities are determined according to a community division result. At least one second article is then determined from an association relationship between each node in the plurality of first node communities and the first article. For example, articles having an association relationship strength greater than a preset threshold are used as second articles. Accordingly, the second articles may be pushed to the user. Thus, articles meeting the user's need can be recommended to the user rapidly and accurately.

The first object may include at least one selected from a group consisting of a person, an article, a multimedia content, etc. Here, the first operation may include operations such as clicking, touching, browsing, and searching performed on the information of the first object. If the first object is a person, the first operation may further include an operation of adding the first object as a contact. If the first object is an article, the first operation may further include an operation of adding the article to a preset network article library. If the first object is a multimedia content, the first operation may further include an operation following or liking the first object, or the like.

The above-mentioned target relationship network may be a pre-established network. The target relationship network may also be created according to association relationships between the plurality of objects in real time.

In some embodiments, the above-mentioned first object may be the same as an object corresponding to one node in the target relationship network, i.e., the first object is one node in the target relationship network.

In some embodiments, the above-mentioned first object may be not a node in the target relationship network, and the first object may have an association relationship with at least one node in the target relationship network.

Taking the case that the first object is a person as an example, in these embodiments, the first object has a relative relationship, a social relationship, a behaviorally interactive relationship, or the like with an object serving as a node in the target relationship network. Taking the case that the first object is an article as an example, the first object has an association relationship such as a same origin place, a same type, and a same function with an object serving as a node in the target relationship network.

The above-mentioned target relationship network includes nodes (or referred to as vertexes) respectively corresponding to the plurality of objects, and includes edges, each of the edges is formed by joining any two objects according to an association relationship between the any two objects. In the relationship network, both a node and an edge may have corresponding attributes. The attributes of the node may include, for example, an object identifier, a total number of objects corresponding to the node, a degree, etc. The degree of the node is a total number of edges connected to the node. The attributes of the edge include: a type of a relationship between objects respectively corresponding to two nodes connected to the edge, a strength of a relationship between the two nodes connected to the edge.

There is usually a limitation of a maximum number on a node community, i.e., a total number of the nodes in each node community cannot exceed the above-mentioned maximum number.

In a large-scale relationship network, in order to improve the efficiency of performing community division on the relationship network, a plurality of threads may be used to perform the community division algorithm in parallel to realize community division on the relationship network.

Due to the limitation of the maximum number on the node community, competition may occur during the process of performing the community division on the target relationship network by the plurality of threads performing the community division algorithm in parallel, i.e., different threads compete for moving the respective nodes to the same node community.

The problem that a plurality of threads competing for adding a plurality of nodes to the same node community may be solved using the locking mechanism. If ordinary locks are used, for a thread that has obtained the lock, an original number of nodes in the node community may be taken as an old value, that is, obtaining the old value; a total number of nodes to be moved to a corresponding node community by the present thread is then accumulated with the old value to obtain a new number of nodes; next, whether the new number of nodes exceeds the above-mentioned limited maximum number for the corresponding node community is determined; if the new number of nodes does not exceed the maximum number for the corresponding node community, the nodes to be moved to the node community is moved to the corresponding node community by the thread, and the new number of nodes is used to replace the original number of nodes, thereby the number of the nodes of the corresponding node community is obtained. If the new number of nodes exceeds the above-mentioned limited maximum number for the corresponding node community, the thread fails to add the nodes to the corresponding node community. A thread that has obtained no lock cannot realize adding the nodes to the corresponding community. Therefore, the above-mentioned process that the thread that has obtained the lock adds the nodes to a corresponding node community includes a series of operations such as obtaining the old value, accumulation, comparison, and replacement. During the process that the thread that has obtained the lock performs the above-mentioned series of operations, the thread might be interrupted to perform other tasks, resulting in low efficiency of performing the community division in parallel.

In this embodiment, the plurality of threads are controlled to perform community division on the target relationship network in parallel using the locks implemented based on the atomic operation instructions.

Here, the atomic operation instruction may be Compare and Swap (CAS) atomic operation instruction. In this embodiment, a series operations such as obtaining a value (obtaining the old value, i.e., the total number of nodes in the original node community), accumulation (accumulating the number of nodes to be added to the corresponding node community with the old value to obtain a new value, i.e., a new number of nodes), comparison (determining whether the new number of nodes exceeds the maximum number), and replacement (if the new value does not exceed the above-mentioned limited maximum number for the node community, the new value is used to replace the old value)

are packaged as instruction level atomic operations by the locks implemented with the atomic operation instructions. The instruction level atomic operations are inseparable. Due to the inseparability of the atomic operation instructions, the threads that have obtained the above-mentioned locks will not be interrupted during the process of performing the series of operations such as obtaining a value, accumulation, comparison, and replacement. Therefore, the threads that have obtained the above-mentioned locks can complete the corresponding community division operations in a very short time. The plurality of first node communities may be determined according to results of performing the community division operation by the plurality of threads.

Due to the inseparability of the atomic operation instructions, the threads obtaining the above-mentioned locks can complete the corresponding community division operations in a very short time, and the efficiency and stability of community division on the target relationship network are improved. Thus, rapid and accurate community division is realized on the target relationship network.

In some embodiments, the above-mentioned locks may be fine-grained locks. If the fine-grained locks are used, second node communities to which nodes are to be added may be pre-determined by the threads. Community division is then performed using the fine-grained locks implemented based on the atomic operation instructions. For each thread, the second node community to which the nodes in the thread are to be added is controlled by a range to be locked by the fine-grained lock. A plurality of threads may simultaneously add their own corresponding nodes to different second node communities without mutual interference, and concurrency performance can be improved.

After the community division on the target relationship network is completed, the first node community corresponding to the first object may be determined. Specifically, if the first object is a node in the target relationship network, the first node community including the first object may be taken as the first node community to which the first node belongs. If the first object is not a node in the target relationship network, the strength of the association relationship between nodes of the target relationship network, for example, each node of the plurality of nodes of the target relationship network, and the first object may be determined, and the first node community to which the node having the maximum strength of the association relationship is taken as the first node community to which the first object belongs.

In this embodiment, the target relationship network associated with the first object is acquired according to the first operation for the first object, the target relationship network is configured to represent an association relationship between a plurality of objects through a node network relationship; the plurality of threads are controlled to perform community division on the target relationship network in parallel using the locks implemented based on the atomic operation instructions, to obtain the plurality of first node communities, each first node community includes at least one node in the target relationship network; and the first node community to which the first object belongs is determined according to the association relationship between the first object and the objects corresponding to nodes in the target relationship network, for example, the object corresponding to each node of the plurality of nodes in the target relationship network. Because community division is performed on the target relationship network in parallel using the locks implemented based on the atomic operation instructions, the efficiency and stability of community division on a social network are improved, and therefore, a node community to which an object belongs can be determined rapidly and accurately.

Figure 2:
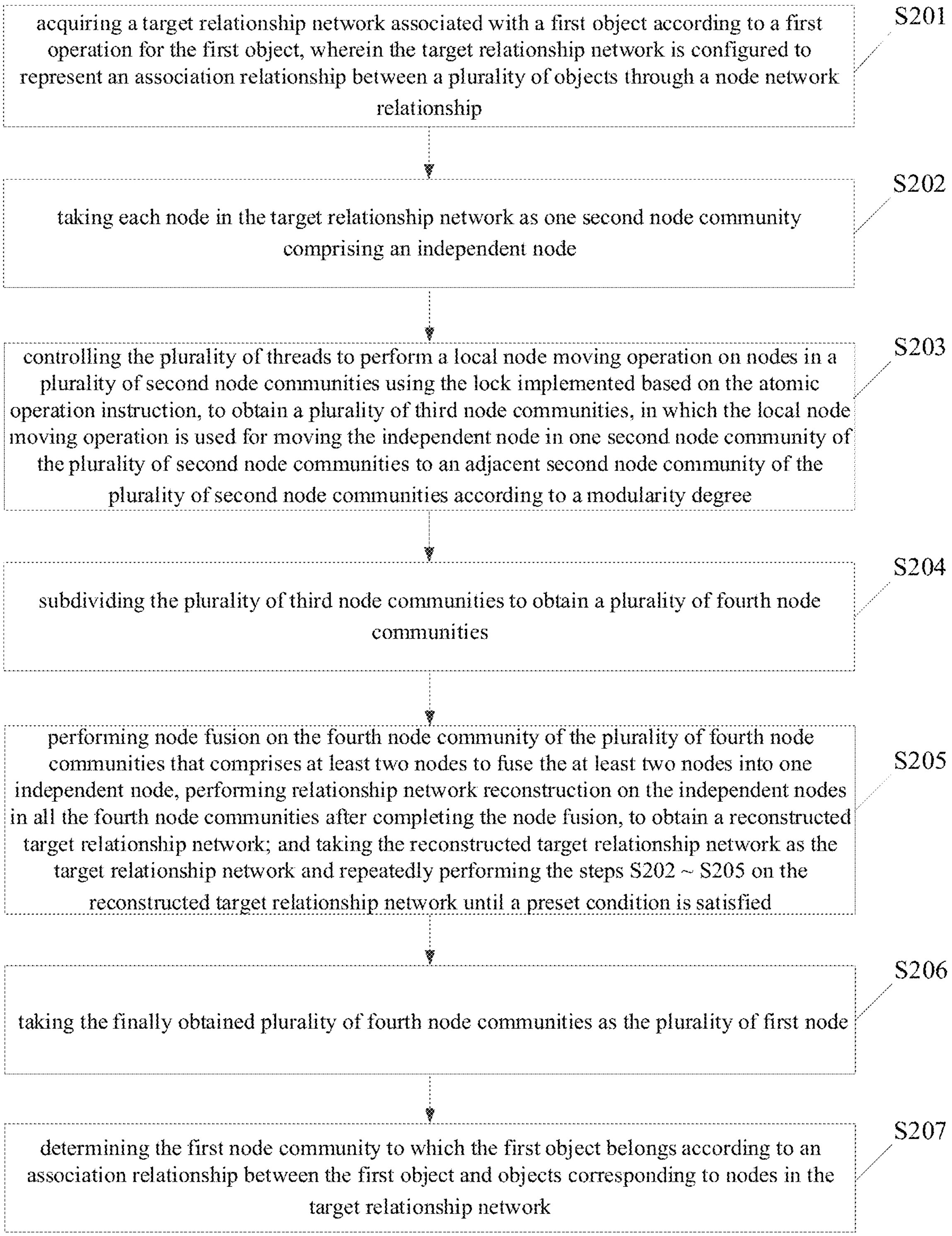
FIG. 2 is a schematic flowchart II of a data processing method provided by the present disclosure.

Referring to FIG. 2, FIG. 2 is a schematic flowchart II of a data processing method provided by the present disclosure. As shown in FIG. 2, the data processing method further includes the following steps:

S201: acquiring a target relationship network associated with a first object according to a first operation for the first object, wherein the target relationship network is configured to represent an association relationship between a plurality of objects through a node network relationship;

The related description of the above step S201 may be referred to the step S101 of the embodiment shown in FIG. 1, which will not be described redundantly here.

S202: taking each node in the target relationship network as one second node community comprising an independent node;

S203: controlling the plurality of threads to perform a local node moving operation on nodes in a plurality of second node communities using the lock implemented based on the atomic operation instruction, to obtain a plurality of third node communities, in which the local node moving operation is used for moving the independent node in one second node community of the plurality of second node communities to an adjacent second node community of the plurality of second node communities according to a modularity degree;

S204: subdividing the plurality of third node communities to obtain a plurality of fourth node communities;

S205: performing node fusion on the fourth node community of the plurality of fourth node communities that comprises at least two nodes to fuse the at least two nodes into one independent node, performing relationship network reconstruction on the independent nodes in all the fourth node communities after completing the node fusion, to obtain a reconstructed target relationship network; and taking the reconstructed target relationship network as the target relationship network and repeatedly performing the steps S202~S205 on the reconstructed target relationship network until a preset condition is satisfied;

S206: taking the finally obtained plurality of fourth node communities as the plurality of first node communities; and S207: determining the first node community to which the first object belongs according to an association relationship between the first object and objects corresponding to nodes in the target relationship network.

Initially, each node in the target relationship network may be taken as one second node community, i.e., the second node community is initially an independent node community. The second node community determined from the reconstructed target relationship network after at least one iteration is a pseudo independent node community. A number of nodes in a relationship network corresponding to a pseudo independent node may be recorded.

The above-mentioned plurality of threads may be threads created in order to perform a community discovery algorithm on a plurality of nodes in the target relationship network in parallel.

In some embodiments, a plurality of nodes (here, the plurality of nodes may correspond to a plurality of second node communities that have independent nodes) in the target relationship network may be allocated to each thread. Specifically, the plurality of nodes in the target relationship network may be randomly allocated to each thread.

For each thread, an adjacent second node community, to which a node that the thread is responsible for is to be moved, may be determined first by the thread. Specifically, for each node, the thread may determine at least one adjacent node of the node according to edges connected to the node. Then, a modularity degree after the node is moved to the second node community where the adjacent node is located is calculated. If it is determined that the modularity degree increases, the adjacent second node community serves as the second node community to which the node is to be moved.

The thread is then controlled to perform the local node moving operation using the lock (e.g., the fine-grained lock) implemented based on the atomic operation instruction. If one node is moved to the second community where the adjacent node is located, the second node community where the adjacent node is located is no longer a second node community having an independent node. During the process of the local node moving operation, only the node(s) in the second node community having the independent node is moved.

If a thread performs the local node moving operation, the lock based on the atomic operation instruction may be run in each thread. In this way, if a plurality of threads compete for moving respective nodes to the same second node community, the threads that have obtained the above-mentioned locks accomplish obtaining the value, accumulation, comparison, and replacement through the inseparable instruction level operations, and then the threads accomplish the operation of adding the corresponding nodes to the above-mentioned second node community. In this process, the threads that have obtained the locks may rapidly realize adding the corresponding nodes to the above-mentioned second node community. By the above-mentioned local node moving operation, the finally remaining second node communities are taken as the third node communities. The above-mentioned third node communities may include an independent node community that comprises an independent node and where the node not moved during the process of the local node moving operation is located, and may include a community including a plurality of nodes.

There may be a discontinuity in a plurality of third node communities resulting from the process of the local node moving operation.

To improve the discontinuity in the above-mentioned third node communities, a subdivision operation may be performed on the third node communities that are not independent nodes.

Further, the above-mentioned subdividing the third node communities to obtain a plurality of fourth node communities includes:

controlling the plurality of threads to respectively subdivide the plurality of third node communities to obtain the plurality of fourth node communities.

For each third node community, one corresponding thread may be allocated to the third node community, and the subdivision of the third node community is performed by the corresponding thread.

For the plurality of third node communities, the plurality of threads that are respectively corresponding to the plurality of third node communities perform the subdivision operation on the plurality of third node communities in parallel.

The plurality of threads respectively corresponding to the plurality of third node communities concurrently subdivide the plurality of third node communities so that a plurality of fourth node communities can be obtained rapidly.

For the plurality of fourth node communities, each fourth node community may be regarded as one node, and a relationship network is reconstructed to obtain the reconstructed target relationship network. Taking the reconstructed target relationship network as the target relationship network, the above-mentioned steps S202~S205 are repeated on the reconstructed target relationship network, and after multiple iterations of the above-mentioned steps S202~S205, the iteration is stopped if a preset condition is satisfied. The finally obtained fourth node communities are taken as the first node communities. It will be appreciated that pseudo single nodes in the finally obtained fourth node communities may be recovered to the form of the nodes in the target relationship network, and a plurality of first node communities are thus obtained.

The above-mentioned preset condition includes a number of iterations meeting a number threshold, or the modularity degree no longer increasing.

In this embodiment, for the target relationship network, the plurality of threads are controlled to perform the local node moving operation on the plurality of nodes (each independent node corresponds to one second node community) in parallel using the locks implemented based on the atomic operation instructions, to obtain the plurality of third node communities, and the third node communities are subdivided, and the plurality of first node communities are determined according to the result of the subdivision. On the one hand, community division on the target relationship network can be realized rapidly; and on the other hand, a community division result with good connectivity can be obtained such that the accuracy of the determined first node community to which the first object belongs is higher.

In some embodiments, the plurality of nodes in the target relationship network are distributed in different devices. Here, the nodes being distributed in the devices refers to the data of the nodes being distributed in the corresponding devices. For each device, the data of the corresponding node may be stored on the device. The above-mentioned data of the node includes, but is not limited, attributes of the node, a total number of edges connected to the node, attributes of the edges connected to the node, and the like. The data processing method further includes the following steps.

Firstly, at least one target second node community to which each node in each device is to be added is determined based on a modularity degree.

Secondly, the devices are ranked according to a preset rule to obtain a first order. Moreover, the above-mentioned step S203 includes:

for each device, in accordance with a rank of the device in the first order, controlling the device to use the plurality of threads to perform the local node moving operation on a plurality of nodes distributed in the device based on the locks implemented by the atomic operation instructions, in which the local node moving operation is used for moving the plurality of nodes of the device to corresponding adjacent target second node communities according to a modularity degree, respectively.

In these embodiments, an electronic device corresponding to the server may connect to the above-mentioned plurality of devices. For the plurality of nodes in the target relationship network, i.e., the second node communities having the independent nodes in step S202, the target second node community to which the plurality of nodes are to be moved may be determined according to a modularity degree increasing rule. Specifically, for one node, a candidate target second node community may be determined according to a connection relationship of the one node with other nodes. A corresponding modularity degree after adding the one node to each candidate target second node community is calculated. A candidate target second node community with an increased value of the modularity degree greater than a preset threshold is taken as the target second node community. Alternatively, a plurality of candidate target second node communities with increased modularity degrees are ranked from a large increased value of the modularity degree to a small increased value of the modularity degree, and a plurality of candidate target second node communities of which serial numbers in the ranking order are smaller than a preset serial number threshold are selected as the target second node communities.

The preset rule may include: for example, ranking the plurality of devices according to a descending order of stored data volume of nodes, or ranking the plurality of devices according to device numbers.

The above-mentioned performing agent may sequentially control each device to perform the local node moving operation according to the first order. Specifically, if each device performs the local node moving operation, a plurality of threads may be used to perform the local node moving operation on a plurality of nodes corresponding to the device based on the locks implemented by the atomic operation instructions in parallel.

After each device completes the above-mentioned local node moving operation, each obtained second node community may be taken as the third node community. It will be appreciated that after nodes in a second node community are moved to the target second node community, the second node community may be deleted.

In some embodiments, the data processing method further includes: synchronizing a result of the local node moving operation performed by each device to other devices. In these embodiments, for each device, after the local node moving is performed on the corresponding nodes by the locks implemented based on the atomic operation instructions in the device, the information of a plurality of second node communities obtained after the local node moving operation is finished may be synchronized to other devices.

In these embodiments, the plurality of nodes in the target relationship network are distributed in different devices, and centralized scheduling may be performed on a plurality of devices to realize that the plurality of devices perform the local node moving operation according to a corresponding order. A plurality of threads are controlled to perform local node moving operation on a plurality of nodes using the locks implemented based on the atomic operation instructions in a single device. Thus, in a distributed environment, the competition among a plurality of nodes is restricted within a single device, and lock operations are also restricted within the single device. There is no need to solve the competition using distributed locks. This is advantageous to reduce the computation amount of community division in the distributed environment such that efficient community division is realized on the target relationship network in the distributed environment.

Figure 3:
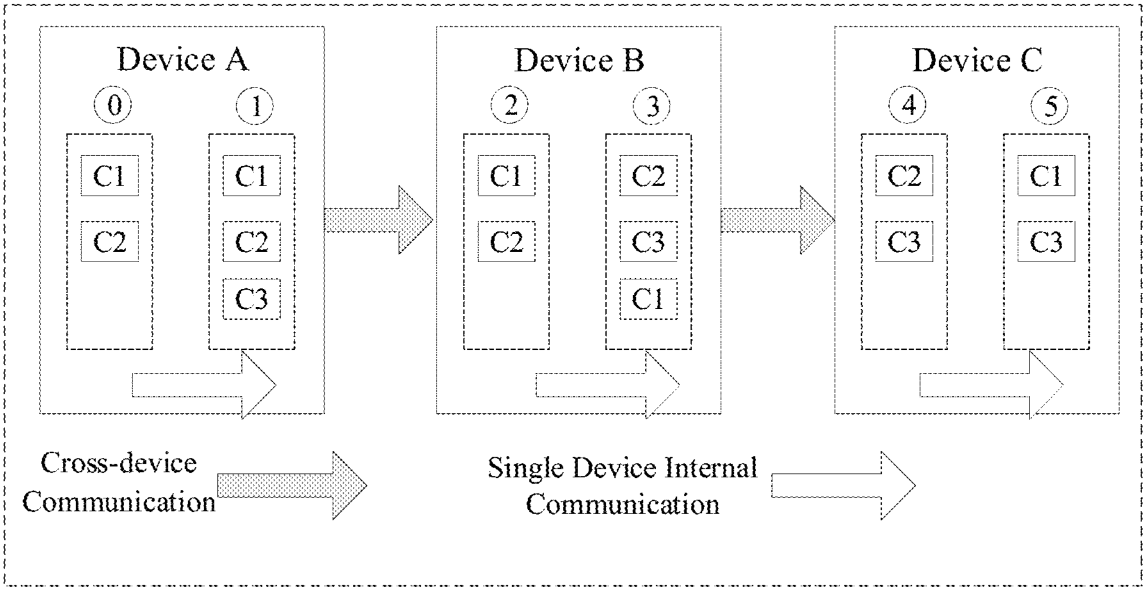
FIG. 3 is a schematic diagram of one application scenario.

With reference to FIG. 3, for example, data of nodes 0 and 1 are stored on a device A, and data of nodes 2 and 3 stored on a device B, and data of nodes 4 and 5 stored on a device C. There are second node communities C1, C2, and C3, and the maximum number of nodes of the node community is 2. During the local node movement, for each node, an increased value of the modularity degree resulting from adding the node to an adjacent second node community is calculated and recorded. For each node, the second node communities to which the node is to be added are ranked from a large increased value of the modularity degree to a small increased value of the modularity degree. A first order corresponding to three devices A, B, and C may be determined. For example, the first order may be as follows: the device A, the device B, and the device C. The devices are then serially traverse according to the above-mentioned first order.

A plurality of threads are still controlled to realize multi-node competition for joining the second node community based on the locks implemented with the atomic operation instructions within each device. Moreover, the variation of the second node community is synchronized to other devices in the form of broadcasting.

For the device A, the node 0 firstly competes for joining the second node community C1, and if failing, competes for joining the second node device C2. Similarly, the node 1 firstly competes for joining the second node community C1, and if failing, competes for joining the second node community C2, and if failing again, competes for joining the second node community C3. The nodes 0 and 1 may successfully join the second node community C1.

Then turning to the device B, the node 2 firstly competes for the second node community C1. Since the second node community C1 already has two nodes, the node 2 fails to join the second community C1, and instead competes for joining the second node community C2. The node 3 will compete for joining the second node community C2 at the very beginning, and the nodes 2 and 3 may successfully join the second node community C2.

Then turning to machine C, the node 4 fails in competing for joining the second node community C2, and the node 5 fails in competing for joining the second node community C1, and then the nodes 4 and 5 succeed in competing for joining the second node community C3. After the final local node moving operation, the resulted third node communities are as follows: {C1:[0,1]}, {C2:[2,3]}, and {C3:[4,5]}.

In some embodiments, the plurality of second nodes in the third node community are distributed in different devices. The second nodes are nodes belonging to the target relationship network.

Here, for the convenience of understanding and to simplify description, the nodes in the third node community are regarded as the second nodes. It will be appreciated that the second nodes of the third node community are still nodes in the target relationship network.

The node data of a plurality of second nodes in one or more of the plurality of third node communities is distributed in different devices, i.e., the plurality of second nodes in at least one third node community correspond to different devices. Similarly, the description like "a second node correspond to a device" refers to the data of the node being stored on the device. For each device, the data of the corresponding second node may be stored on the device.

Figure 4:
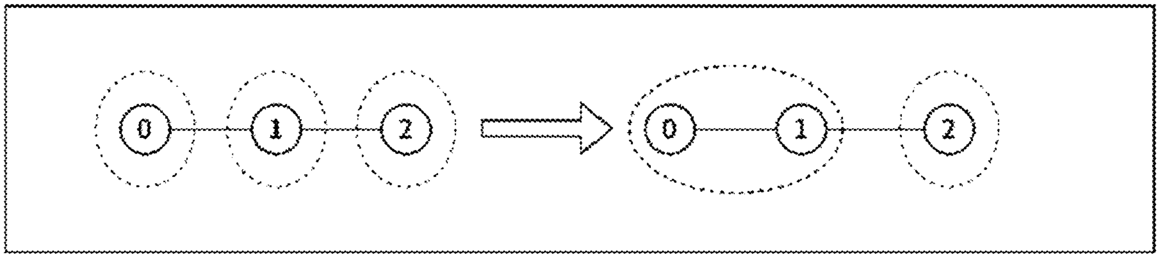
FIG. 4 is a schematic diagram of one application scenario.

Referring to FIG. 4, FIG. 4 shows one application scenario. As shown in FIG. 4, a third node community includes a second node 0, a second node 1, and a second node 2. If an original traversal order is the order from 0 to 1 to 2, at the beginning, the second node 0, the second node 1, and the second node 2 have their own fourth node communities to which they belong. Upon the traversal proceeding to the node 0, the fourth node community where the node 0 is located has only one second node, and the second node 0 is called an "independent node", and such a fourth node community may be referred to as a fourth node community with an independent node. An attempt may be made to add the second node 0 to the fourth node community where the second node 1 is located. If the modularity degree increases, after a probability selection, the second node 0 may be added to the fourth node community where the second node 1 is located. In this way, the second nodes 1 and 0 are not independent nodes. During the process of the subdivision operation, only the "independent node" is added to other fourth node communities. Upon the traversal proceeding to the second node 1, the second node 1 is not the "independent node" and thus is directly skipped over. Finally, traversal proceeds to the second node 2, if an attempt is made to add the second node 2 to the fourth node community where the second node 1 is located and it is found that the modularity degree is does not increase, it is determined that the second node does not join the fourth node community where the second node 1 is located. Therefore, the fourth node community where the second node 2 is located is retained. Through the above-mentioned process, the third node community is subdivided into the fourth node community including the second node 0 and the second node1 and the fourth node community including the second node 2.

Performing the subdivision operation on the third node community requires serially traversing all second nodes within one third node community, and the traversal order of these second nodes may be random. If the second nodes within one third node community are scattered in a plurality of devices, high frequency cross-device communication is required, and consequently, the operation of subdividing the third node community is inefficient.

Figure 5:
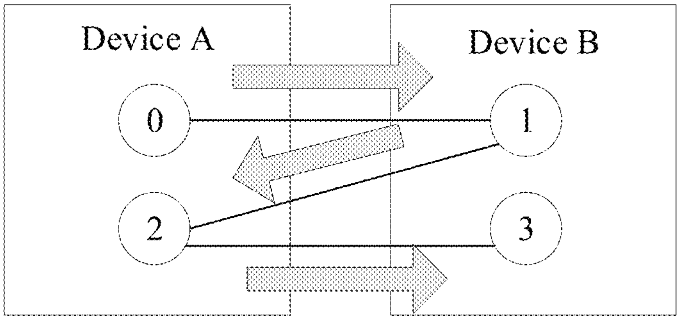
FIG. 5 is a schematic diagram of one application scenario.

Referring to FIG. 5, FIG. 5 is a schematic diagram of one application scenario. As shown in FIG. 5, for a second node 0, a second node 1, a second node 2, and a second node 3 in a third node community, it is assumed that an original traversal order is the order from the second node 0 to the second node 1, to the second node 2, and finally to the second node 3. The second nodes 0 and 2 correspond to device A, and the second nodes 1 and 3 correspond to device B. If subdivision is carried out according to the order from the second node 0, to the second node 1, to the second node 2, and finally to the second node 3, the device A needs to synchronizes information with the device B upon the second node 0 joining the fourth node community where the second node 1 is located. After the second node 1 ends, the device B sends information to the device A such that the second node 2 is subdivided by the device A. After the subdivision of the second node 2 is completed, the device A sends information to the device B for subdividing the second node 3. In this way, information interaction needs to be performed between devices for multiple times.

In these embodiments, the data processing method further includes: ranking the devices in accordance with a preset rule to obtain a second order; and the above-mentioned step 204 includes:

for each device, in accordance with a rank of the device in the second order, controlling the device to use the plurality of threads to perform subdivision according to a plurality of first nodes corresponding to the device.

Further, the data processing method further includes:

for each device, synchronizing a result of subdivision of the third node community that is completed in the device to other devices such that other devices locally perform subdivision according to the result of subdivision.

To solve the problem of needing frequent message synchronization across devices during subdividing the third node communities, the order of the devices may be determined, and the devices are serially traversed (the second nodes on the same device are also serially traversed), which can guarantee that the number of message synchronizations remains consistent with the number of the devices involved in the third node community.

Figure 6:
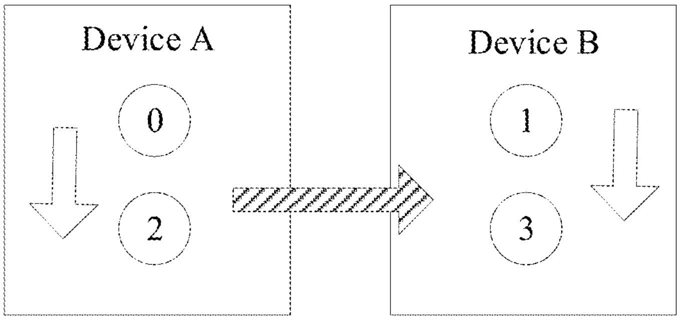
FIG. 6 is a schematic diagram of one application scenario.

With reference to FIG. 5 and FIG. 6, FIG. 6 is a schematic diagram of one application scenario. For the second node 0, the second node 1, the second node 2, and the second node 3 in a third node community, the second nodes 0 and 2 correspond to device A, and the second nodes 1 and 3 correspond to device B. For the problem of needing frequent communication between devices during traversing a plurality of second nodes in FIG. 5, subdivision may be performed using the solution shown in FIG. 6. Firstly, the traversal order of the devices A and B is first A and then B. For the second nodes 0 and 2 in the device A, the third node community may be subdivided according to the order from the second node 0 to the second node 2. After the traversal of the second nodes in the device A is completed, the second nodes 1 and 3 corresponding to the device B are traversed. For the second nodes 1 and 3 in the device B, the third node community may be subdivided according to the order from the second node 1 to the second node 3.

Upon the second node 0 being subdivided in the device A, an attempt is made to traverse, for the second node 0, the fourth node community where adjacent nodes are located. If it is determined that the second node 0 is added to the fourth node community 1 where the second node 1 is located, the modularity degree may be increased, and after a probability selection, the second node 0 is added to the fourth node community where the second node 1 is located. Moreover, the result of subdivision is notified to all the other devices in the form of broadcasting, i.e., the result of the subdivision that the second node 0 joins the fourth node community where the second node 1 is located is synchronized to the device B.

Next, the second node 2 is traversed. If it is determined that the second node 2 is added to the fourth node community where the second node 1 is located or the second node 2 is added to the fourth node community where the second node 3 is located with no increase in the modularity degree, the second node 2 is not added to other fourth node communities and the original fourth node community of the second node 2 is retained. At this time, all the second nodes in the device A are traversed completely.

The device B may be traversed. Since the number of nodes of the fourth node community 1 where the second node 1 is located exceeds 1, this second node is directly skipped over. Next, each adjacent fourth node community is traversed for the second node 3, and an attempt is made to add the second node 3 to the adjacent fourth node community. If it is determined that the modularity degree may be increased after joining the fourth node community where the second node 2 is located, after a probability selection, the second node 3 may be added to the fourth node community where the second node 2 is located. The result of subdivision is notified to all the other devices in the form of broadcasting, i.e., the result of subdivision that the second node 3 joins the fourth node community where the second node 2 is located after the subdivision is synchronized to the device A. In a similar fashion, all the devices are traversed, thereby completing the subdivision operation. In these embodiments, the order of subdividing the second nodes is adjusted according to the corresponding devices such that the number of synchronization rounds of result information of subdivision between the devices is in direct proportion to the number of the devices. The number of communications across the devices is reduced, and then a communication cost is reduced.

Figure 7:
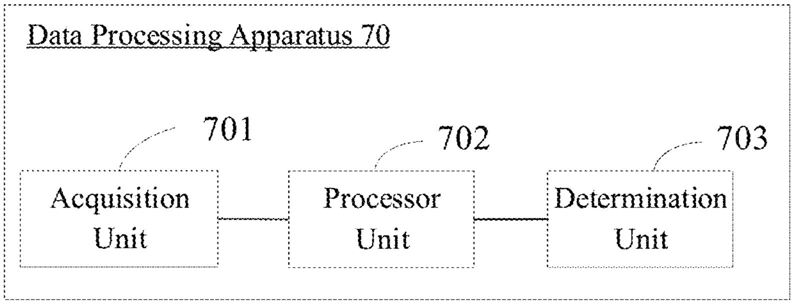
FIG. 7 is a schematic structural block diagram of a data processor apparatus provided by the present disclosure.

FIG. 7 is a structural block diagram of a data processor apparatus provided by an embodiment of the present disclosure. For ease of description, only the parts related to embodiments of the present disclosure are illustrated. Referring to FIG. 7, the data processor apparatus 70 includes an acquisition unit 701, a processor unit 702, and a determination unit 703.

The acquisition unit 701 is configured to acquire a target relationship network associated with a first object according to a first operation for the first object, wherein the target relationship network is configured to represent an association relationship between a plurality of objects through a node network relationship.

The processor unit 702 is configured to control a plurality of threads to perform a community division on the target relationship network in parallel using locks implemented based on an atomic operation instruction, to obtain a plurality of first node communities, wherein each of the first node communities comprises at least one node in the target relationship network.

The determination unit 703 is configured to determine the first node community to which the first object belongs according to an association relationship between the first object and an object corresponding to nodes in the target relationship network.

In one embodiment of the present disclosure, the processor unit 702 is further configured to:

take each node in the target relationship network as one second node community comprising an independent node (Step1), control the plurality of threads to perform a local node moving operation on nodes in a plurality of second node communities using the lock implemented based on the atomic operation instruction, to obtain a plurality of third node communities, the local node moving operation being used for moving the independent node in one second node community of the plurality of second node communities to an adjacent second node community of the plurality of second node communities according to a modularity degree (Step2), subdivide the plurality of third node communities to obtain a plurality of fourth node communities (Step 3), perform node fusion on the fourth node community of the plurality of fourth node communities that comprises at least two nodes to fuse the at least two nodes into one independent node, perform relationship network reconstruction on the independent nodes in all the fourth node communities after completing the node fusion, to obtain a reconstructed target relationship network (Step 4), taking the reconstructed target relationship network as the target relationship network, repeatedly perform the steps 1~5 on the reconstructed target relationship network until a preset condition is satisfied (Step 5), and take the finally obtained plurality of fourth node communities as the plurality of first node communities (Step 6).

In some embodiments, the processor unit 702 is further configured to:

control the plurality of threads to subdivide the plurality of third node communities to obtain a plurality of fourth node communities.

In some embodiments, a plurality of nodes in the target relationship network are distributed in different devices. The data processor apparatus 70 further includes a first ranking unit (not shown in the figure). The first ranking unit is configured to:

rank the devices in accordance with a preset rule to obtain a first order.

The processor unit 702 is further configured to:

for each device, in accordance with a rank of the each device in the first order, control the each device to use the plurality of threads to perform the local node moving operation on a plurality of nodes distributed in the each device based on the locks implemented by the atomic operation instructions, the local node moving operation being used for moving the plurality of nodes of the each device to corresponding adjacent target second node communities according to the modularity degree, respectively.

In some embodiments, the data processor apparatus further includes a first synchronization unit (not shown in the figure) which is configured to:

synchronize a result of the local node moving operation performed by each device to other devices.

In some embodiments, a plurality of second nodes in the third node communities are distributed in different devices, and the second nodes are nodes in the target relationship network. The data processor apparatus 70 further includes a second ranking unit (not shown in the figure). The second ranking unit is configured to:

rank the devices in accordance with a preset rule to obtain a second order.

The processor unit 702 is further configured to:

for each device, in accordance with a rank of the each device in the second order, control the each device to use the plurality of threads to perform subdivision according to a plurality of second nodes in the each device.

In some embodiments, the data processor apparatus further includes a second synchronization unit (not shown in the figure) which is configured to:

for each device, synchronize a result of the subdivision completed in the device to other devices such that other devices locally perform subdivision according to the result of the subdivision.

To implement the above embodiments, an embodiment of the present disclosure further provides an electronic device.

Figure 8:
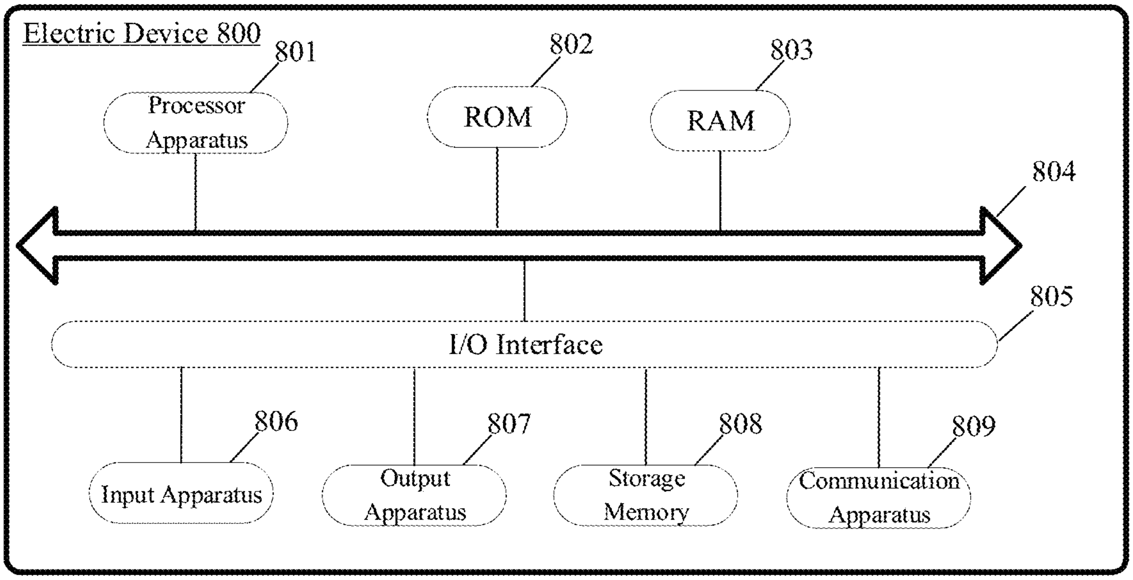
FIG. 8 is a schematic diagram of a hardware structure of an electronic device provided in an embodiment of the present disclosure.

Referring to FIG. 8, FIG. 8 illustrates a schematic structural diagram of an electronic device 800 suitable for implementing some embodiments of the present disclosure, and the electronic device 800 may be a terminal device or a server. The electronic device in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 8 is merely an example, and should not pose any limitation to the functions and the range of use of the embodiments of the present disclosure.

As illustrated in FIG. 8, the electronic device 800 may include a processor apparatus 801 (e.g., a central processing unit, a graphics processing unit, etc.), which can perform various suitable actions and processing according to a program stored in a read-only memory (ROM) 802 or a program loaded from a storage memory 808 into a random-access memory (RAM) 803. The RAM 803 further stores various programs and data required for operations of the electronic device 800. The processor apparatus 801, the ROM 802, and the RAM 803 are interconnected by means of a bus 804. An input/output (I/O) interface 805 is also connected to the bus 804.

Usually, the following apparatus may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage memory 808 including, for example, a magnetic tape, a hard disk, or the like; and a communication apparatus 809. The communication apparatus 809 may allow the electronic device 800 to be in wireless or wired communication with other devices to exchange data. While FIG. 8 illustrates the electronic device 800 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 809 and installed, or may be installed from the storage memory 808, or may be installed from the ROM 802. Upon the computer program being executed by the processor apparatus 801, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, when the above one or more programs are executed by the electronic device, the electronic device is caused to execute the method shown in the above embodiment.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

At a first aspect, one or more embodiments of the present disclosure provide a data processing method which comprises: acquiring a target relationship network associated with a first object according to a first operation for the first object, wherein the target relationship network is configured to represent an association relationship between a plurality of objects through a node network relationship;

controlling a plurality of threads to perform a community division on the target relationship network in parallel using locks implemented based on an atomic operation instruction, to obtain a plurality of first node communities, wherein each of the first node communities comprises at least one node in the target relationship network; and determining the first node community to which the first object belongs according to an association relationship between the first object and objects corresponding to nodes in the target relationship network.

According to one or more embodiments of the present disclosure, controlling the plurality of threads to perform a community division on the target relationship network in parallel using the locks implemented based on an atomic operation instruction, to obtain a plurality of first node communities comprises:

Step 1: taking each node in the target relationship network as one second node community comprising an independent node;

Step 2: controlling the plurality of threads to perform a local node moving operation on nodes in a plurality of second node communities using the lock implemented based on the atomic operation instruction, to obtain a plurality of third node communities, wherein the local node moving operation is used for moving the independent node in one second node community of the plurality of second node communities to an adjacent second node community of the plurality of second node communities according to a modularity degree;

Step 3: subdividing the plurality of third node communities to obtain a plurality of fourth node communities;

Step 4: performing node fusion on the fourth node community of the plurality of fourth node communities that comprises at least two nodes to fuse the at least two nodes into one independent node, performing relationship network reconstruction on the independent nodes in all the fourth node communities after completing the node fusion, to obtain a reconstructed target relationship network; and Step 5: taking the reconstructed target relationship network as the target relationship network, repeatedly performing the steps 1~5 on the reconstructed target relationship network until a preset condition is satisfied, and Step 6: taking the finally obtained plurality of fourth node communities as the plurality of first node communities.

According to one or more embodiments of the present disclosure, subdividing the third node communities to obtain the plurality of fourth node communities comprises:

controlling the plurality of threads to respectively subdivide the plurality of third node communities to obtain the plurality of fourth node communities.

According to one or more embodiments of the present disclosure, a plurality of nodes in the target relationship network are distributed in different devices, and the data processing method further comprises:

ranking the devices in accordance with a preset rule to obtain a first order; and controlling the plurality of threads to perform the local node moving operation on nodes in the plurality of second node communities using the lock implemented based on the atomic operation instruction, to obtain the plurality of third node communities comprises:

for each device of the devices, in accordance with a rank of the each device in the first order, controlling the each device to use the plurality of threads to perform the local node moving operation on a plurality of nodes distributed in the each device based on the lock implemented by the atomic operation instruction, wherein the local node moving operation is used for moving the plurality of nodes of the each device to corresponding adjacent target second node communities according to the modularity degree, respectively.

According to one or more embodiments of the present disclosure, the data processing method further comprises: synchronizing a result of the local node moving operation performed by the device to other devices.

According to one or more embodiments of the present disclosure, a plurality of second nodes in the third node communities are distributed in different devices, and the second nodes are nodes in the target relationship network; and the data processing method further comprises:

ranking the devices in accordance with a preset rule to obtain a second order; and the subdividing the third node communities to obtain the plurality of fourth node communities comprises:

for each device of the devices, in accordance with a rank of the device in the second order, controlling the device to use the plurality of threads to perform subdivision according to a plurality of second nodes in the device.

According to one or more embodiments of the present disclosure, the data processing method further comprises:

for each device of the devices, synchronizing a result of subdivision of the third node community that is completed in the device to other devices such that the other devices locally perform the subdivision according to the result of subdivision.

At a second aspect, one or more embodiments of the present disclosure provide a data processor apparatus which comprises an acquisition unit, a processor unit and a determination unit;

the acquisition unit is configured to acquire a target relationship network associated with a first object according to a first operation for the first object, wherein the target relationship network is configured to represent an association relationship between a plurality of objects through a node network relationship;

the processor unit is configured to control a plurality of threads to perform a community division on the target relationship network in parallel using locks implemented based on an atomic operation instruction, to obtain a plurality of first node communities, wherein each of the first node communities comprises at least one node in the target relationship network; and the determination unit is configured to determine the first node community to which the first object belongs according to an association relationship between the first object and an object corresponding to nodes in the target relationship network.

According to one or more embodiments of the present disclosure, the processor unit is further configured to take each node in the target relationship network as one second node community comprising an independent node (Step1), control the plurality of threads to perform a local node moving operation on nodes in a plurality of second node communities using the lock implemented based on the atomic operation instruction, to obtain a plurality of third node communities, the local node moving operation being used for moving the independent node in one second node community of the plurality of second node communities to an adjacent second node community of the plurality of second node communities according to a modularity degree (Step2), subdivide the plurality of third node communities to obtain a plurality of fourth node communities (Step 3), perform node fusion on the fourth node community of the plurality of fourth node communities that comprises at least two nodes to fuse the at least two nodes into one independent node, perform relationship network reconstruction on the independent nodes in all the fourth node communities after completing the node fusion, to obtain a reconstructed target relationship network (Step 4), taking the reconstructed target relationship network as the target relationship network, repeatedly perform the steps 1~5 on the reconstructed target relationship network until a preset condition is satisfied (Step 5), and take the finally obtained plurality of fourth node communities as the plurality of first node communities (Step 6).

According to one or more embodiments of the present disclosure, the processor unit is further configured to:

control the plurality of threads to subdivide the plurality of third node communities to obtain a plurality of fourth node communities.

According to one or more embodiments of the present disclosure, a plurality of nodes in the target relationship network are distributed in different devices; the data processor apparatus further includes a first ranking unit; the first ranking unit is configured to:

rank the devices in accordance with a preset rule to obtain a first order;

the processor unit is further configured to:

for each device, in accordance with a rank of the each device in the first order, control the each device to use the plurality of threads to perform the local node moving operation on a plurality of nodes distributed in the each device based on the locks implemented by the atomic operation instructions, the local node moving operation being used for moving the plurality of nodes of the each device to corresponding adjacent target second node communities according to the modularity degree, respectively.

According to one or more embodiments of the present disclosure, the data processor apparatus further includes a first synchronization unit (not shown in the figure), and the first synchronization unit is configured to:

synchronize a result of the local node moving operation performed by each device to other devices.

According to one or more embodiments of the present disclosure, a plurality of second nodes in the third node communities are distributed in different devices, and the second nodes are nodes in the target relationship network; the data processor apparatus further includes a second ranking unit; the second ranking unit is configured to:

rank the devices in accordance with a preset rule to obtain a second order;

the processor unit is further configured to:

for each device, in accordance with a rank of the device in the second order, control the each device to use the plurality of threads to perform subdivision according to a plurality of second nodes in the each device.

According to one or more embodiments of the present disclosure, the data processor apparatus further includes a second synchronization unit (not shown in the figure) which is configured to:

for each device, synchronize a result of the subdivision completed in the device to other devices such that other devices locally perform subdivision according to the result of the subdivision.

In a third aspect, one or more embodiments of the present disclosure provide an electronic device which comprises at least one processor and a memory;

the memory stores computer-executable instructions; and the at least one processor executes the computer-executable instructions stored on the memory so that the at least one processor executes the data processing method according to the above-mentioned first aspect or any possible design according to the above-mentioned first aspect.

In a fourth aspect, a one or more embodiments of the present disclosure provide a computer-readable storage medium, the computer-readable storage medium stores computer-executable instructions, and upon the computer-executable instructions being executed by a processor, the data processing method according to the above-mentioned first aspect or any possible design according to the above-mentioned first aspect are implemented.

In a fifth aspect, one or more embodiments of the present disclosure provide a computer program product, the computer program product includes a computer program, upon the computer program being executed by a processor, the data processing method according to the above-mentioned first aspect or any possible design according to the above-mentioned first aspect is implemented are realized.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A data processing method, comprising:

acquiring a target relationship network associated with a first object according to a first operation for the first object, wherein the target relationship network is configured to represent an association relationship between a plurality of objects through a node network relationship;

controlling a plurality of threads to perform a community division on the target relationship network in parallel using locks implemented based on an atomic operation instruction, by performing a local node moving operation, to obtain a plurality of first node communities, wherein each of the first node communities comprises at least one node in the target relationship network, wherein the local node moving operation is used for moving an independent node in a community to an adjacent node community according to a modularity degree; and determining the first node community to which the first object belongs according to an association relationship between the first object and objects corresponding to nodes in the target relationship network.

2. The data processing method according to claim 1, wherein controlling the plurality of threads to perform a community division on the target relationship network in parallel using the locks implemented based on an atomic operation instruction, by performing the local node moving operation, to obtain a plurality of first node communities comprises:

Step 1: taking each node in the target relationship network as one second node community comprising the independent node;

Step 2: controlling the plurality of threads to perform the local node moving operation on nodes in a plurality of second node communities using the lock implemented based on the atomic operation instruction, to obtain a plurality of third node communities, wherein the local node moving operation is used for moving the independent node in one second node community of the plurality of second node communities to an adjacent second node community of the plurality of second node communities according to the modularity degree;

Step 3: subdividing the plurality of third node communities to obtain a plurality of fourth node communities;

Step 4: performing node fusion on the fourth node community of the plurality of fourth node communities that comprises at least two nodes to fuse the at least two nodes into one independent node, performing relationship network reconstruction on the independent nodes in all the fourth node communities after completing the node fusion, to obtain a reconstructed target relationship network; and Step 5: taking the reconstructed target relationship network as the target relationship network, repeatedly performing the steps 1~5 on the reconstructed target relationship network until a preset condition is satisfied, and Step 6: taking the finally obtained plurality of fourth node communities as the plurality of first node communities.

3. The data processing method according to claim 2, wherein subdividing the third node communities to obtain the plurality of fourth node communities comprises:

controlling the plurality of threads to respectively subdivide the plurality of third node communities to obtain the plurality of fourth node communities.

4. The data processing method according to claim 2, wherein a plurality of nodes in the target relationship network are distributed in different devices, and the data processing method further comprises:

ranking the devices in accordance with a preset rule to obtain a first order; and controlling the plurality of threads to perform the local node moving operation on nodes in the plurality of second node communities using the locks implemented based on the atomic operation instructions, to obtain the plurality of third node communities comprises:

for each device of the devices, in accordance with a rank of the each device in the first order, controlling the each device to use the plurality of threads to perform the local node moving operation on a plurality of nodes distributed in the each device based on the lock implemented by the atomic operation instruction, wherein the local node moving operation is used for moving the plurality of nodes of the each device to corresponding adjacent target second node communities according to the modularity degree, respectively.

5. The data processing method according to claim 4, wherein the locks implemented based on the atomic operation instructions are fine-grained locks implemented based on the atomic operation instructions.

6. The data processing method according to claim 4, further comprising: synchronizing a result of the local node moving operation performed by the each device to other devices.

7. The data processing method according to claim 2, wherein a plurality of second nodes in the third node communities are distributed in different devices, and the second nodes are nodes in the target relationship network; and the data processing method further comprises:

ranking the devices in accordance with a preset rule to obtain a second order; and the subdividing the third node communities to obtain the plurality of fourth node communities comprises:

for each device of the devices, in accordance with a rank of the each device in the second order, controlling the each device to use the plurality of threads to perform subdivision according to a plurality of second nodes in the each device.

8. The data processing method according to claim 7, further comprising:

for each device of the devices, synchronizing a result of subdivision of the third node community that is completed in the each device to other devices such that the other devices locally perform the subdivision according to the result of subdivision.

9. The data processing method according to claim 1, wherein the first object comprises at least one selected from a group consisting of a person, an article, a multimedia content;

the first operation comprises at least one selected from a group consisting of clicking, touching, browsing, and searching performed on information of the first object.

10. The data processing method according to claim 1, wherein the target relationship network is a pre-established network, or, the target relationship network is created according to association relationships between the plurality of objects in real time.

11. The data processing method according to claim 1, wherein the first object is one node in the target relationship network, and the first node community comprising the first object is taken as the first node community to which the first node belongs.

12. The data processing method according to claim 1, wherein the first object is not a node in the target relationship network, and the first object has an association relationship with at least one node in the target relationship network;

a strength of the association relationship between each node of the target relationship network and the first object is determined, and the first node community to which the node having a maximum strength of the association relationship is taken as the first node community to which the first object belongs.

13. The data processing method according to claim 2, wherein for each thread of the plurality of threads, an adjacent second node community, to which a node that the thread is responsible for is to be moved, is determined first by the each thread.

14. The data processing method according to claim 13, wherein the target relationship network comprises a plurality of nodes respectively corresponding to the plurality of objects, and the target relationship network comprises edges, each of the edges is formed by joining any two objects of the plurality of objects according to an association relationship between the any two objects;

for each node of the plurality of the nodes in the target relationship network, the each thread determines at least one adjacent node of the each node according to the edges connected to the each node; then, a modularity degree after the each node is moved to the second node community where the adjacent node is located is calculated; if it is determined that the modularity degree increases, the adjacent second node community serves as the second node community to which the node is to be moved.

15. The data processing method according to claim 2, wherein after performing the local node moving operation, finally remaining second node communities are taken as the plurality of third node communities.

16. The data processing method according to claim 2, wherein the preset condition includes a total number of times of repeatedly performing the steps 1~5 meeting a number threshold, or the modularity degree no longer increasing.

17. The data processing method according to claim 3, wherein for each third node community, one corresponding thread of the plurality of threads is allocated to the each third node community, and subdivision of the each third node community is performed by the corresponding thread;

for the plurality of third node communities, the plurality of threads that are respectively corresponding to the plurality of third node communities perform the subdivision on the plurality of third node communities in parallel.

18. The data processing method according to claim 3, wherein a plurality of nodes in the target relationship network are distributed in different devices, and the data processing method further comprises:

ranking the devices in accordance with a preset rule to obtain a first order; and controlling the plurality of threads to perform the local node moving operation on nodes in the plurality of second node communities using the locks implemented based on the atomic operation instructions, to obtain the plurality of third node communities comprises:

for each device of the devices, in accordance with a rank of the each device in the first order, controlling the each device to use the plurality of threads to perform the local node moving operation on a plurality of nodes distributed in the each device based on the lock implemented by the atomic operation instruction, wherein the local node moving operation is used for moving the plurality of nodes of the each device to corresponding adjacent target second node communities according to the modularity degree, respectively.

19. An electronic device, comprising a processor and a memory, wherein the memory stores computer-executable instructions; and the processor executes the computer-executable instructions stored on the memory to cause a data processing method to be executed;

the data processing method comprises:

acquiring a target relationship network associated with a first object according to a first operation for the first object, wherein the target relationship network is configured to represent an association relationship between a plurality of objects through a node network relationship;

controlling a plurality of threads to perform a community division on the target relationship network in parallel using locks implemented based on an atomic operation instruction, by performing a local node moving operation, to obtain a plurality of first node communities, wherein each of the first node communities comprises at least one node in the target relationship network, wherein the local node moving operation is used for moving an independent node in a community to an adjacent node community according to a modularity degree; and determining the first node community to which the first object belongs according to an association relationship between the first object and objects corresponding to nodes in the target relationship network.

20. A non-transitory computer-readable storage medium, storing computer-executable instructions, wherein upon the computer-executable instructions being executed by a processor, a data processing method is implemented;

the data processing method comprises:

acquiring a target relationship network associated with a first object according to a first operation for the first object, wherein the target relationship network is configured to represent an association relationship between a plurality of objects through a node network relationship;

controlling a plurality of threads to perform a community division on the target relationship network in parallel using locks implemented based on an atomic operation instruction, by performing a local node moving operation, to obtain a plurality of first node communities, wherein each of the first node communities comprises at least one node in the target relationship network, wherein the local node moving operation is used for moving an independent node in a community to an adjacent node community according to a modularity degree; and determining the first node community to which the first object belongs according to an association relationship between the first object and objects corresponding to nodes in the target relationship network.

* * * * *